United States Patent [19]

Gresser et al.

[11] Patent Number: 4,546,231

[45] Date of Patent: Oct. 8, 1985

[54] CREATION OF A PARTING ZONE IN A CRYSTAL STRUCTURE

[75] Inventors: Herbert D. Gresser, Plainview; Joseph Nussenbaum, New York, both of N.Y.

[73] Assignee: Group II Manufacturing Ltd., Hicksville, N.Y.

[21] Appl. No.: 550,786

[22] Filed: Nov. 14, 1983

[51] Int. Cl.[4] .............................................. B23K 26/00
[52] U.S. Cl. ............................ 219/121 LN; 125/30 R
[58] Field of Search ................ 219/121 LG, 121 LN, 219/121 LH, 121 LJ; 125/30 R, 30 WD

[56] References Cited

U.S. PATENT DOCUMENTS 3,970,819  7/1976  Gates et al. .................... 219/121 LJ
4,401,876  8/1983  Cooper et al. ................. 219/121 LJ

*Primary Examiner*—C. L. Albritton
*Attorney, Agent, or Firm*—McAulay, Fields, Fisher, Goldstein & Nissen

[57] ABSTRACT

A method of providing a thin parting zone in diamond and other crystal material is used to separate the crystal into multiple parts. The method comprises the following steps. An entrance window is prepared on the outer surface of the crystal. The window can transmit a beam of energy. An energy beam is focussed on a point zone of energy absorbing material which is spaced from the window in the crystal. The energy absorbing zone is generated at the focal point of the beam. The focal point of the beam is scanned through a succession of overlapping potential damage cells which lie along a predetermined parting zone within the crystal. The beam creates a plurality of actual damage cells comprised of shattered material which creates the parting surface. The succession of potential damage cell is such that the previously generated actual damage cells do not lie along the path of the beam between the actual damage cells being generated and the window.

7 Claims, 7 Drawing Figures

CREATION OF A PARTING ZONE IN A CRYSTAL STRUCTURE

BACKGROUND OF THE INVENTION

This invention relates in general to the generation of a parting zone or plane for separating a crystal structure into two or more separate pieces. More particularly, this invention relates to the generation of a parting zone in a crystal material, such as a diamond, where the parting zone so created is not the natural cleavage plane of the crystal structure.

Presently available methods of cutting diamonds include:

Cleaving along the natural cleavage plane of the diamond which limits the shapes into which the diamonds can be cut, causes loss of those segments which cannot otherwise be made into a commercial diamond structures, requires a great deal of time and skill, and creates the risk of substantial loss or lessening of the diamond's value if the split does not follow along the proper cleavage plane; and sawing methods which are slow, require a large kerf or with the risk of shattering.

The purpose of this invention is to provide a more versatile technique for cutting a crystal such as a diamond into two or more pieces.

It is the purpose of this invention to provide such technique that the risk of damage to the diamond during the process is reduced as compared to the present techniques that employ a saw.

It is a related purpose of this invention to provide such means and technique as require less highly skilled individuals, than now required.

It is a further purpose to provide a diamond cutting technique that can be completed more quickly than the total process that surrounds the present diamond cutting techniques.

Yet a further purpose is to provide such a technique which requires a smaller kerf that those methods which employ a saw and hence which results in less loss of diamond material.

Yet a further purpose is to generate a plane which simulates the crystal cleavage plane without the octahedral restrictions. In this fashion, a synthetic cleavage plane may be generated.

BRIEF DESCRIPTION

U.S. Pat. No. 4,392,476 issued July 12, 1983 describes the technique of using a laser beam to inscribe indicia on the surface of a precious stone such as a diamond. The indicia are subvisible and can perform the function of providing characteristic information about the stone.

In brief, one embodiment of this invention employs a continuous wave (CW) Q-switched laser to deliver energy, at the focal point of the laser beam, on overlapping potential damage cells along any predetermined parting plane or parting surface within a diamond to thereby shatter the diamond material in a portion of each of these theoretical damage cells referred to herein as actual damage cells. The beam shatters the crystal material forming confined damage cells and it is believed there is a conversion of the form of the the carbon material to graphite. When the damage cells are generated to form a contiguous region, the result is a parting zone which thus has little holding strength. The diamond then can be readily parted into two segments along this parting zone.

In order to start the process the laser beam has to be focussed on any energy absorbing spot. Once that spot has been physically altered, it serves as the starting point or zone for a series of overlapping potential damage zones. That is, by indexing the focal point of the laser beam by some substantial fraction of the width of each potential damage zone, any given parting surface can be covered with a series of actual damage cells. The parting surface may be a plane or a curved surface zone of shattered material.

In order for the laser beam to be projected into the diamond, it is necessary to provide a window on a portion of the surface of the diamond. The window eliminates aberration and scattering of the incident radiation. A converging laser beam is projected through the window to an opposing surface of the diamond. The surface at the far end must have a light absorbing spot, which will normally have to be placed there in order to initiate this process.

Because each shattered zone will block the light from passing through the zone, it it important that the process start along a portion of the surface that is far removed from the window. For the same reason, it is important that the axis of the laser beam be at an angle so the direction of the column of overlapping zones being generated and the actual damage cells already generated do not block a portion of the laser beam. Thus, a parting surface being developed must be generated by a scan sequence which avoids blocking the incident energy at any point in the scan.

DESCRIPTION OF THE PREFERRED EMBODIMENTS

Figure 1:
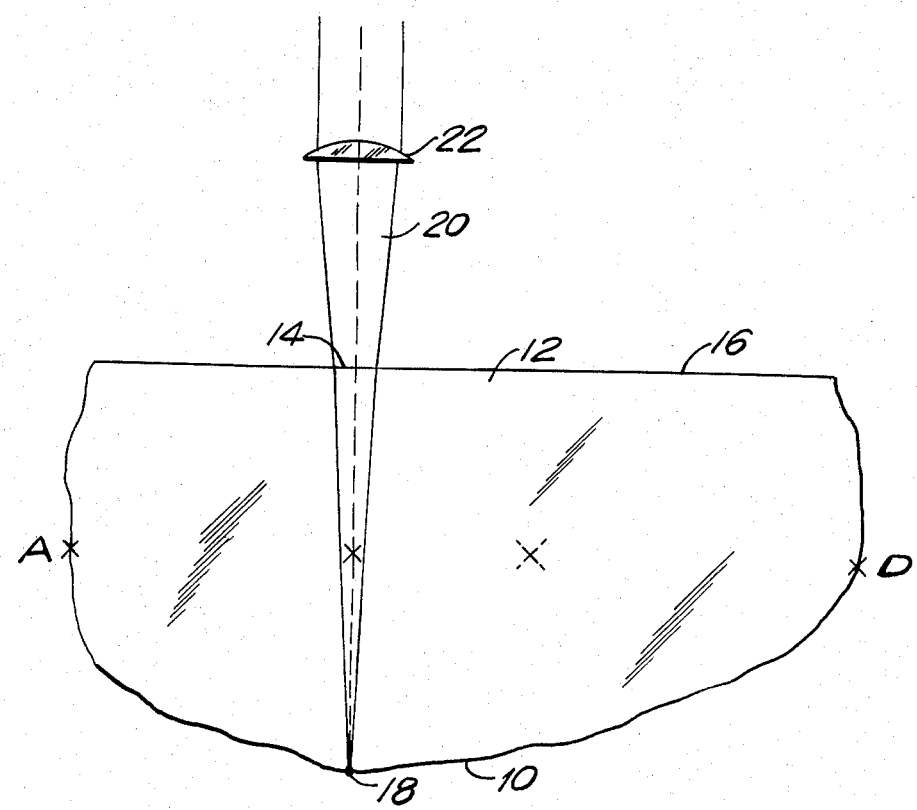
FIG. 1 is a schematic drawing showing the generation of a damage cell in a diamond in accordance with the method of the present invention

Referring now to the drawings and more particularly to FIG. 1 in accordance with the method of the present invention a parting zone is created in a diamond 12. Although diamond 12 is used to illustrate the method of the present invention, the method can be used to create a thin parting zone in any crystal material, due to the changes which occur in the bonding structure of the crystal material when an appropriate energy beam is focused therein. The parting zone may be any plane or curved surface zone of the diamond and need not be the natural cleavage plane of the diamond 12.

To create parting zone, an entrance window 14 is prepared, preferably by polishing, on the top surface 16 of diamond 12. An initial point zone of energy absorbing material 18 is provided which is spaced from window 14. Zone 18 may be a naturally occuring impurity present on the diamond 12 but more often zone 18 is created by applying an appropriate energy absorbing spot onto diamond 12.

A CW Q-switched laser beam 20, such as that described in issued U.S. Pat. No. 4,392,476 is focused on zone 18 using an objective lens 22. Beam 20 enters the diamond 12 through window 14 which transmits the focused beam to zone 18. Zone 18 serves as an initial focal point F. The axis of beam 20 from zone 18 to window 14 is within the diamond 12.

Window 14 must be wide enough to accommodate the converging beam and, must line up with the peripheral edge of the parting zone. As shown in FIG. 1, window 14 extends across the diamond 12 from side A to side D.

When the beam is focused upon the zone 18 it causes physical changes to occur in the structure of diamond 12. These changes increase absorptivity by trapping light and by shattering. As used herein each successive portion of the diamond which is altered in structure by each pulse of the laser beam is referred to as an actual damage cell 24.

Figure 2:
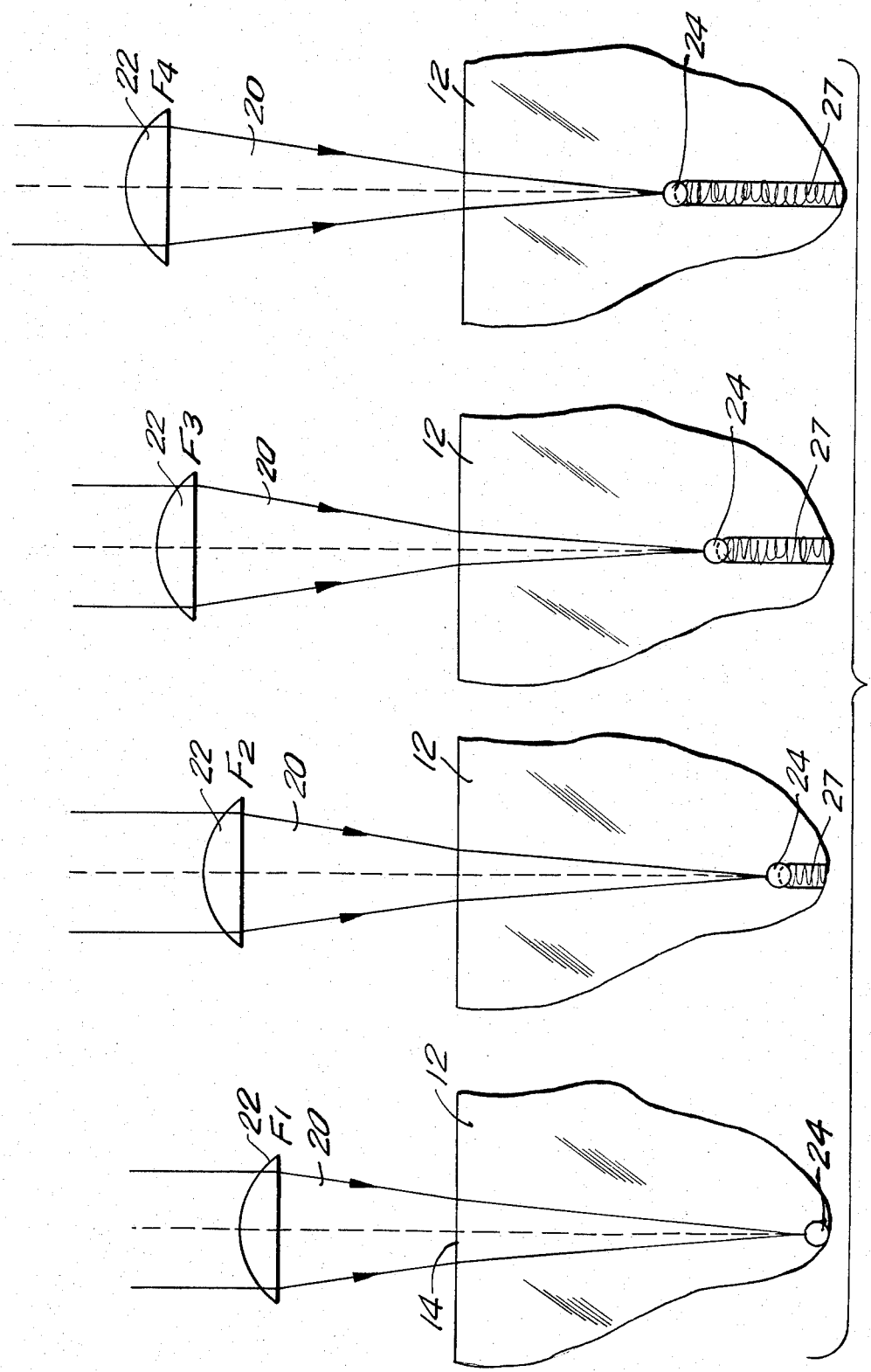
FIG. 2 is a schematic drawing showing the step of scanning the focal point of the energy beam.

The parting zone 13 (see FIG. 7) results from a plurality of contiguous actual damage cells, all substantially identical to actual damage cell 24. As shown in FIG. 2, the objective lens 22 is successively moved so that the focal point of the beam 20 is scanned through a succession of potential damage cells 28 along the predetermined parting zone within the diamond to create an internal surface of actual damage cells comprised of shattered material. Thus, by moving the focal point F, to a series of new locations $F_1...F_x$, a first column 27 of actual damage cells $24...24_x$ is created. The last actual damage cell of the column is positioned adjacent window 14. After first column 27 of actual damage cells is created. Successive, overlapping columns 27, are generated until the entire parting zone is generated.

The actual damage cells 24 generated by each indexing are not co-extensive in area with the potential damage cells 28, but rather each actual damage cell has a volume somewhat smaller than its corresponding potential damage cell. This is because once the structure of the actual damage cell is altered by the beam the actual damage cell is opaque to the beam and further suitable alteration of its structure cannot occur. Hence, although the focal point is scanned such that the potential damage cells overlap one another, only that portion of each potential damage cell which has not already been altered in structure by the beam can be altered by the beam when it is moved to be the next successive focal point.

Figure 7:
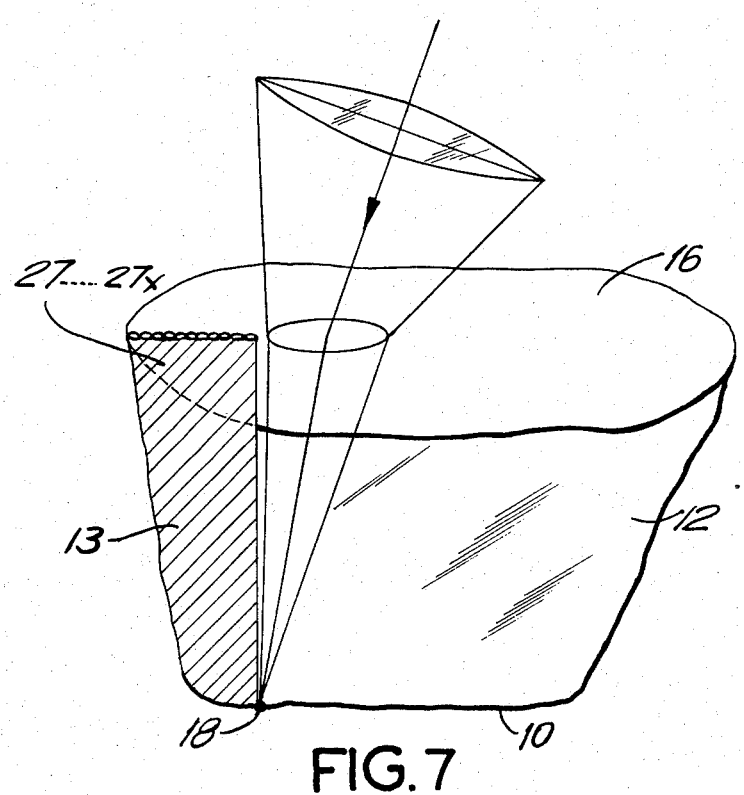
FIG. 7. is a schematic drawing showing the step of maintaining the axis of the energy beam at the proper angle to avoid vignetting.

As shown in FIG. 7, to avoid having a high proportion of the energy of the light beam obscured by the generated actual damage cells, the angle of incidence of the light beam at the window may not be normal to the surface. Rather, the axis of the light beam should be maintained at an angle such that the converging light cone will not be obscured by the previously generated damage cells, which angle is greated than half the convergence angle of the beam. In this way the beam does not strike the previously general column of actual damage cells but focuses upwards so that the new potential damage cells will be overlapping and along side of the old column of actual damage cells.

Figure 4:
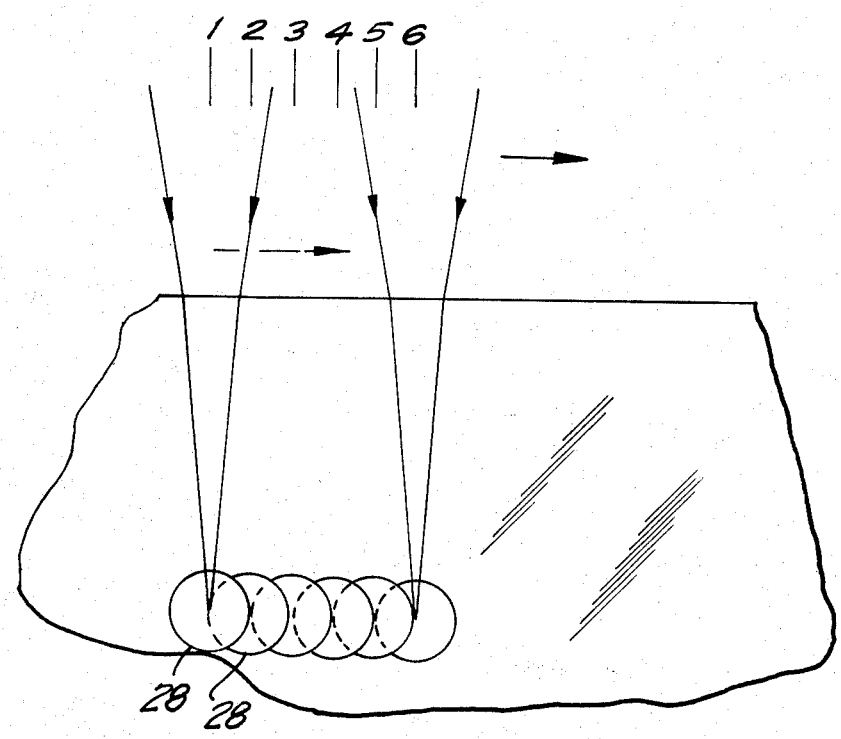
FIG. 4 is a schematic drawing showing the generation of a horizontal parting zone in a diamond in accordance with the method of the present invention.
Figure 3:
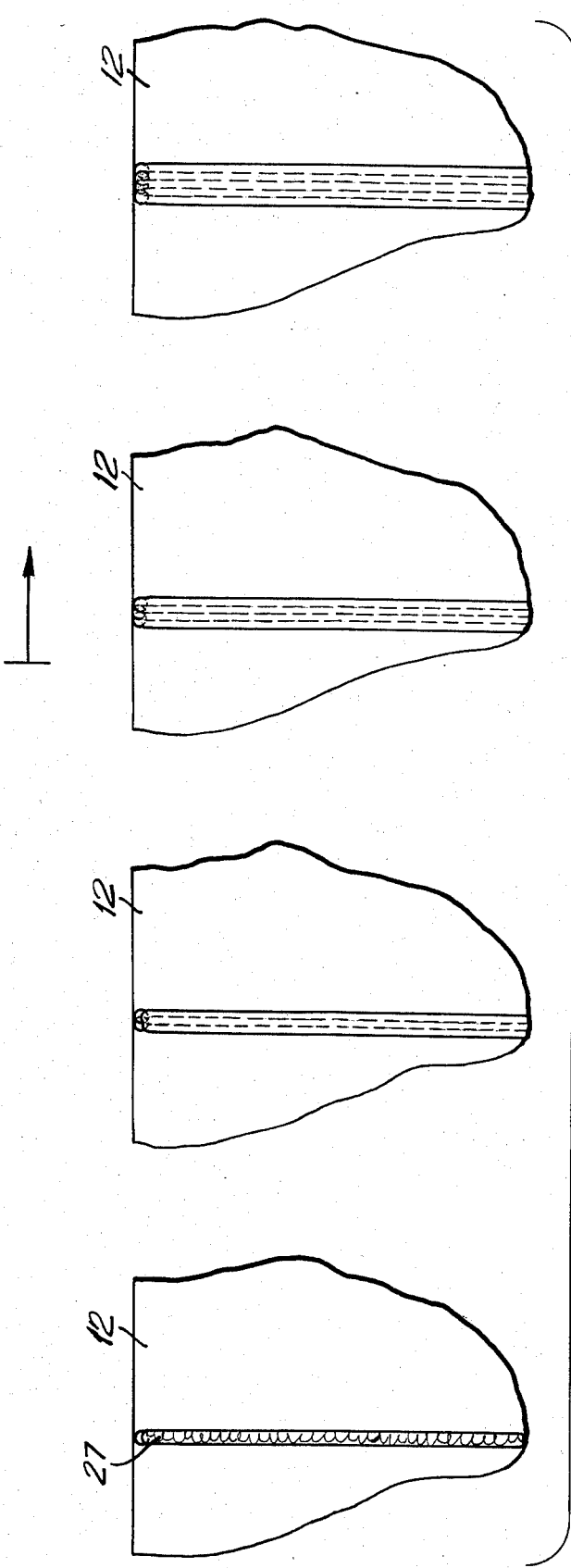
FIG. 3 is a schematic drawing showing the generation of a vertical parting zone in a diamond in accordance with the method of the present invention.
Figure 5:
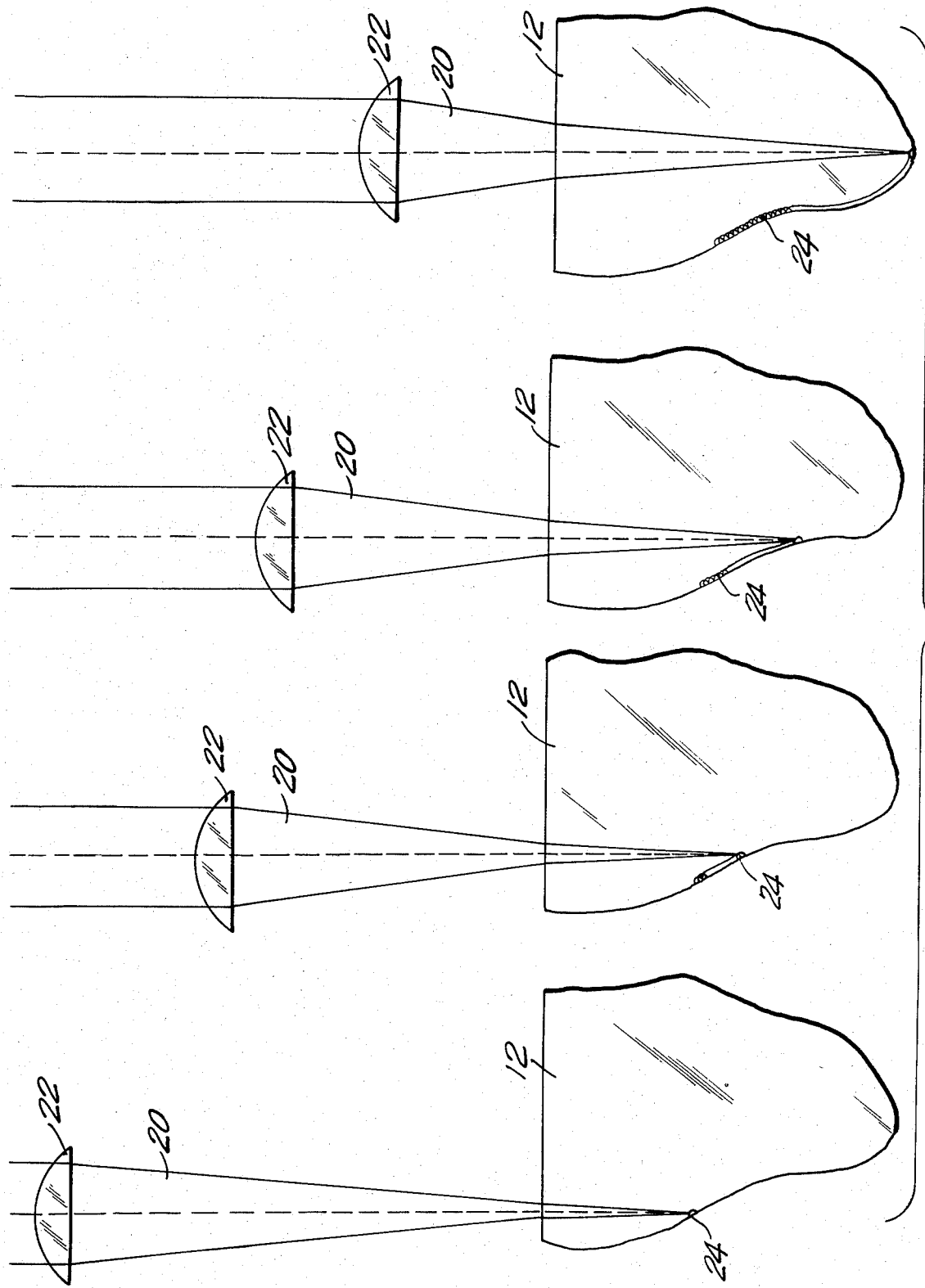
FIG. 5 is a schematic drawing showing the generation of a contoured parting zone in a diamond in accordance with the method of the present invention.
Figure 6:
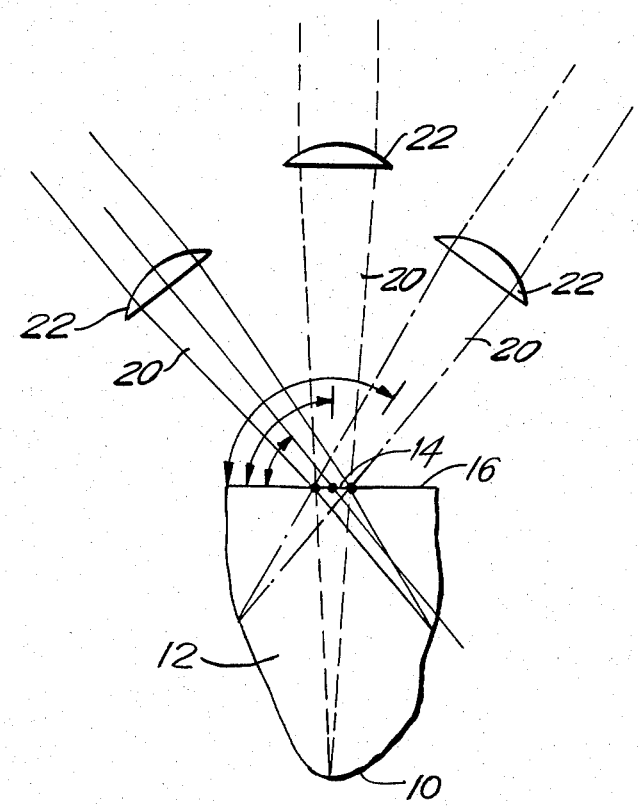
FIG. 6 is a schematic drawing showing a parting zone in a diamond being generated by a series of lines having a locus radiating from a small area in accordance with the method of the present invention.

As shown by FIGS. 3, 4 and 5 the parting zone may be vertical, horizontal, contoured, or any combination of the foregoing. Further, the diamond 12 may be divided into a plurality of sections by generating more than one parting zone. Additionally, as shown in FIG. 6 the parting zone may be generated by a series of lines whose locus radiates from a small area on window 14. When this type of parting zone is desired window 14 is made somewhat smaller.

After the parting zone 13 is generated, diamond 12 can be parted using a parting knife, chemical action, ultra-sonic vibrations, or other appropriate means.

The parting zone 13 is generated from the bottom surface 10 of the diamond upwardly to the top surface 16. Thus, a large kerf is not required to permit access of the converging laser beam.

In one embodiment of the method of the present invention the Q-switched laser generates pulses at between two to ten kHz. The diameter of each potential damage cell is between three to twenty-five microns, and the potential damage cells may overlap one another by about 50%. The time that it takes to generate a parting zone can be calculated using the following formula:

$$T = \frac{A}{D^2 \times R^2 \times PRF}$$

Where:
T is the time in seconds needed to create the parting zone.
A is the area of the parting zone in mm$^2$.
D is the diameter of the potential damage cell in millimeters.
R is the overlap ratio of the potential damage cells.
PRF is pulses per second of the laser beam.

Using methods of the present invention a parting zone can be created in a one carat diamond having a 6 mm × 6 mm cross section in between six to eight minutes. In contrast, between two to eight hours are needed to create a parting zone in a diamond of equal weight and area using conventional methods.

The generation of the parting zone by the method of the present invention can be automatically programmed with no need for an individual to continuously monitor the process.

The method of the present invention is advantageous when compared to previously known methods for cutting diamonds. Specifically, the method of the present invention is not limited by octahedral or other crystal restrictions on the parting zone being created as does cleavage along the natural parting plane. The method of the present inventions requires a significantly smaller kerf than either disc or laser sawing. The method of the present invention takes significantly less time than does sawing.

What we claim is:

1. The method of providing a thin parting zone in a crystal material for separating the crystal into multiple parts comprising the steps of:

preparing an entrance window on the outer surface of the crystal, said window being adapted to transmit a beam of energy, focusing an energy beam on a point zone of energy absorbing material in said crystal spaced from said window, the axis of said beam from said point zone to said window being within the crystal, generating an energy absorbing zone at the focal point of said beam, scanning the focal point of said beam through a succession of overlapping potential damage cells along a predetermined parting zone within the crystal to provide a plurality of actual damage cells comprised of shattered material as a parting surface for the crystal, a portion of said damage cells being within the interior of said crystal, and determining the succession of said potential damage cells such that none of the previously generated actual damage cells lie along the path of said beam between the actual damage cells being generated and the window.

2. The method of providing a thin parting zone in a diamond for separating the diamond into multiple parts comprising the steps of:

preparing an entrance window on the outer surface of the diamond, said window being adapted to transmit a beam of energy, focusing an energy beam on a point zone of energy absorbing material in said diamond spaced from said window, the axis of said beam from said point zone to said window being within the diamond, shattering a portion of the diamond at the focal point of said beam to thus create an actual damage cell, scanning the focal point of said beam through a succession of overlapping potential damage cells along a predetermined parting zone within the diamond to provide a surface of actual damage cells comprised of shattered material as a parting surface for the diamond, a portion of said surface of actual damage cells being within the interior of said diamond, and determining the succession of said potential damage cells such that none of the previously generated actual damage cells lie along the path of the said beam between the actual damage cells being generated and the window.

3. The diamond parting method of claim 2 wherein said steps of scanning and determining comprise:

first scanning a line of overlapping potential damage cells by positioning said focal point of said beam along successive points of a predetermined line between said absorbing zone and said window.

the first zone being shattered being the furtherest removed from said window and the last zone being shattered being positioned at said window, and subsequently scanning successive overlapping columns of potential damage cells by positioning the focal point of said beam from a first end point of the column being scanned that is removed from said window to a second end point of the column being scanned that is adjacent to said window.

4. The diamond parting method of claim 3 wherein said step of scanning includes:

maintaining the axis of said beam at an angle to the tangent of the column being shattered, said angle being greater than half the convergence angle of said beam.

5. The method of generating a thin parting zone in a rough diamond for separating the diamond into multiple parts, comprising the steps of:

polishing a window in the surface of the diamond, creating a light absorptive spot on the surface of the diamond at a position substantially spaced from said window, projecting a laser beam through said window, focusing said laser beam on said light absorptive spot, shattering a portion of said diamond at said focal point of said laser beam to thus create an actual damage cell, scanning said focal point of said laser beam through a succession of overlapping potential damage cells along a predetermined parting surface to provide a surface zone of damage cells comprised of shattered material as a parting surface for the diamond, a portion of said surface zone of damage cells being within the interior of said diamond, and determining the succession of said potential damage cells such that none of the previously generated damage cells lie along the path of the laser beam between the damage cells being generated and the window.

6. The diamond parting method of claim 5 wherein said steps of scanning and determining comprises:

first scanning a line of overlapping potential damage cells by positioning said focal point of said laser beam along successive of a predetermined line between said absorptive spot and said window, and subsequently scanning successive overlapping columns of potential damage cells by positioning the focal point of said laser beam from a first end point of the column being scanned that is removed from said window to a second end point of the column being scanned that is adjacent to said window.

7. The diamond parting method of claim 6 wherein said step of scanning includes:

maintaining the axis of said laser beam at an angle to the tangent of the column being shattered, said angle being greater than half the convergence angle of said laser beam.

* * * * *